Nov. 28, 1933.  L. RADO  1,937,069

FLEXIBLE TUBING

Filed Feb. 10, 1930

L. Rado, Inventor

By: Marks & Clerk, Attys.

Patented Nov. 28, 1933

1,937,069

UNITED STATES PATENT OFFICE 1,937,069

FLEXIBLE TUBING

Leopold Rado, Berlin-Wannsee, Germany

Application February 10, 1930, Serial No. 427,412, and in Germany September 9, 1929

3 Claims. (Cl. 137—90)

The invention relates to flexible tubing with an inner lining and consists substantially in that the materials which are used for the inner lining are known in themselves but have not been suggested previously for this purpose. The materials are non-fibrous cellulose foils or cellulose foils lined with metal foils, which are likewise already known. When employing these materials it is possible to use all kinds of flexible tubing of rubber or rubberized materials as well as flexible metal tubing and the like for such liquids and gases as would attack the bare material of the tubing and would thus themselves be attacked or contaminated. This advantage applies particularly in the case of tubing for motor spirit since such spirit has a solvent action on rubber.

By cellulose foils is understood the thin nonfibrous celulose membrances, known to the trade and usually made from viscose, for example, cellulose hydrate foils, as well as similar products which are manufactured in sheet form from the different cellulose derivatives (e. g cellulose acetate).

By lining these cellulose foils with thin metal foils, e. g. aluminum foil, using suitable adhesives (e. g. paste, bone glue, gelatine solution, celluloid solution, colophonium solution, solution of caoutchouc or gutta-percha or solutions of natural or synthetic resins) thin but extremely resistant metal-cellulose foil is obtained in the known manner.

It is also known, by applicant's copending application Serial Number 352,252 and U. S. Patent Number 1,831,751 issued November 10, 1931, that hollow bodies can be manufactured of strips of these cellulose foils or metal-cellulose foils by winding several layers of the strips round a core, the separate windings being glued together if necessary. This process for the manufacture of hollow bodies as well as the hollow bodies themselves can be employed with particular advantage for the purpose of the present invention.

By employing these known materials for the lining of flexible tubing, a flexible tubing is obtained, in which according to the invention the inner lining comprises a tubular insertion of non-fibrous cellulose foil wound in a plurality of layers. In this connection the cellulose foil may be combined by means of adhesives with a metal foil. By using metal foil, either alone or in combination with cellulose foil, the impermeability of the lining is considerably increased and the cellulose foil is prevented from shrinking.

It has been found preferable to keep the diameter of the lining greater than the internal lining of the flexible tubing, so that the inserted lining possesses longitudinal folds. It is likewise preferable to employ linings which in the extended condition possess a greater length than the flexible tubing, so that the inserted lining possesses transverse folds. Such a lining follows all the bending and extending of the flexible tubing without kinking.

There are many ways of fixing the lining to the inner wall of the flexible tubing. For example, the lining may be merely inserted loosely in the flexible tubing, the ends only being attached to the tubing. This type of attachment is particularly suitable for very elastic rubber tubing. The lining may of course be attached to the rubber tubing by suitable adhesive along the whole of its length. This attachment, however, is only suitable for stiff tubing or for such as are not to be excessively bent, for although the cellulose foil is to a certain extent extensible, it has no elasticity, with the consequence that, in the case of sharp bends, the lining will kink.

It has been found particularly advantageous merely to attach as known the lining in isolated places to the inner surface of the flexible tubing, for example by sticking them together in places. According to a form of construction, the attachment to the inner surface of the flexible tubing is effected by means of annular retaining parts, for example, metal rings, spiral springs or the like.

The flexible tubing according to the invention may be manufactured in a variety of ways. For instance, the lining may be drawn in to the finished flexible tubing, that is to say both the tubing and the inner lining for it are manufactured separately. It is also possible to manufacture the flexible tubing in such a manner that the inner lining is first wound on a mandrel and the outer component of the tubing is then formed over the lining e. g. by winding.

In the case of flexible tubing in which the inner lining is attached by means of annular retaining parts, for example, metal rings, spiral springs or the like, the metal rings or spirals are first of all placed on a mandrel, the cellulose foil alone or cellulose foil in combination with metal intended for the lining is then wound round the said rings or spirals, and over this is wound the outer sheath consisting e. g. of rubber or rubberized fabric and if necessary vulcanized under pressure. On drawing out the mandrel from the flexible tubing after vulcanizing, the tubing so obtained is corrugated in longitudinal section, and has great flexibility on account of the corrugation of the lining of cellulose or metal-cellulose. This is especially the case, when the winding of the cellulose foil or of the metal-cellulose is effected without sticking the individual layers together. In this case, the lining is pressed into the corrugations and held firmly by the metal rings or the spiral wire. In this form of construction, it is in no case necessary to stick the lining to the inner wall of the flexible tubing.

The use of linings for flexible tubing according to the invention has a particular advantage for metal flexible tubing, since the otherwise necessary packing of the spiral turns of the metal flexible tubing may be entirely omitted. This object is achieved in a very much greater measure by the provision of a lining according to the present invention.

When metal-cellulose foils are used it is in many cases advantageous to use the metal foil as the innermost layer of the lining of the flexible tubing.

This formation of the inner lining is particularly advantageous in the case of tubes which are used for conveying rapidly evaporating fluids. The metal foil protects the cellulose hydrate foil from the detrimental action of these fluids, which cellulose hydrate foil would otherwise become brittle under the action of the vapors of the fluids.

Figure 1:
Fig. 1 is a view partly in section and partly in elevation of one form of the invention.
Figure 2:
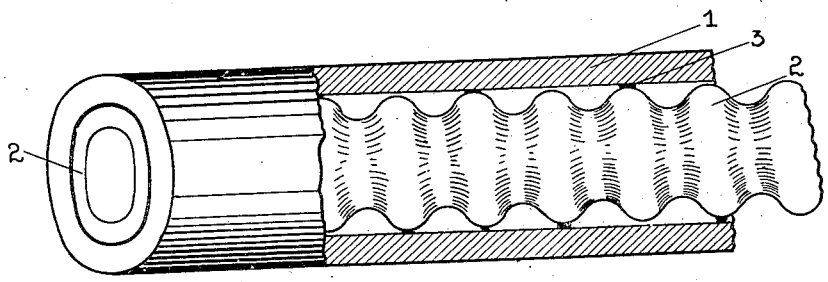
Fig. 2 is a similar view of a modified form.
Figure 3:
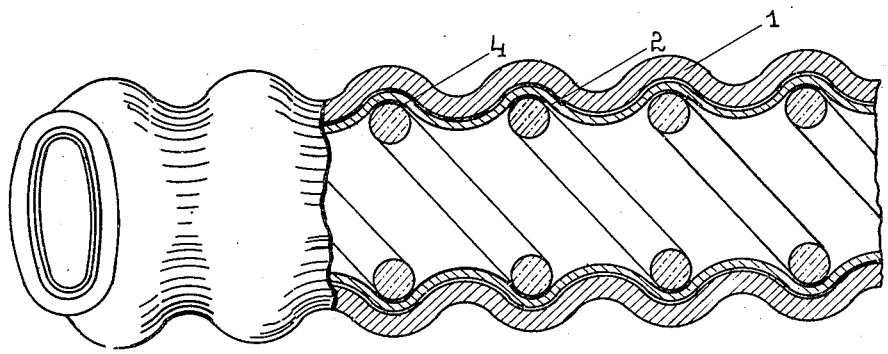
Fig. 3 is a modification of still another modified form.

By way of example, forms of construction of the invention are shown diagrammatically in the accompanying drawing, in which, Figure 1 shows a flexible rubber tubing 1, provided with a lining 2 of cellulose foil or metal-cellulose foil. In Figure 2 the lining 2, which is longer than the flexible tubing itself, is introduced into the tubing in such a manner as to produce transverse folds. These folds are stuck at the places marked 3 to the inner wall of the tubing. Figure 3 shows a flexible tubing manufactured in the manner hereinbefore described by winding on a mandrel. A spiral spring 4 is first placed on the mandrel, and on this the lining 2 of cellulose foil or metal-cellulose foil is wound in the known manner, without sticking the layers together. The flexible tubing is now manufactured over the wound lining in the known manner e. g. by winding rubber sheets having a fabric lining, and vulcanized. Such a flexible tubing possesses great flexibility although the inner lining of cellulose film possesses of itself almost no elasticity. By reason of the corrugated folding, however, the lining is able to follow the movements of the flexible tubing owing to the extension of the folds, without kinking or bending.

The lining of rubber tubing with spirally-wound, so-called flexible metal tubing is known, as is also the use of asbestos linings or the like, for packing the said spirals. Apart from the fact that rubber tubing provided with metal linings in this way is excessively heavy, there is the additional disadvantage that, despite careful packing of the turns of the spiral, it is impossible to avoid the liquid in time finding its way to the wall of the tubing and attacking it.

What I claim is:

1. A flexible tubing comprising a casing of flexible material and a lining therefor consisting of helically wound cellulose film coated with metal foil constituting in the lining a plurality of separated layers.

2. A flexible tubing comprising a casing of flexible material and a lining therefor consisting of helically wound cellulose film coated with metal foil constituting in the lining a plurality of separated layers, said lining being annularly corrugated to permit longitudinal extension of the lining incident to the bending of the flexible casing.

3. A flexible tubing comprising a casing of flexible material and a lining therefor consisting of helically wound cellulose film coated with metal foil constituting in the lining a plurality of separated layers, said lining being annularly corrugated to permit longitudinal extension of the lining incident to the bending of the flexible casing, and adhesive material applied at segregated spots to connect the lining with the casing to prevent displacement of the lining as a whole within the casing.

LEOPOLD RADO.